Nov. 19, 1968   J. R. PHIPPS   3,411,412
FUEL REGULATING DEVICE
Filed April 28, 1967   2 Sheets-Sheet 1

INVENTOR.
JACK R. PHIPPS
BY
ATTORNEY

Nov. 19, 1968 J. R. PHIPPS 3,411,412
FUEL REGULATING DEVICE
Filed April 28, 1967 2 Sheets-Sheet 2

INVENTOR.
JACK R. PHIPPS
BY
ATTORNEY

United States Patent Office 3,411,412
Patented Nov. 19, 1968

3,411,412
FUEL REGULATING DEVICE
Jack R. Phipps, St. Clair Shores, Mich., assignor to The Bendix Corporation, a corporation of Delaware
Filed Apr. 28, 1967, Ser. No. 634,634
15 Claims. (Cl. 91—52)

ABSTRACT OF THE DISCLOSURE

A fuel regulating device responsive to variations in fuel viscosity, having a fuel chamber and a member in the chamber forming a laminar flow restriction. A movable wall responsive to differential pressures in said chamber regulates a fuel metering device in accordance with changes in fuel viscosity, the member in the chamber being adjustable to vary the effective operation of the movable wall on the element.

---

Figure 1:
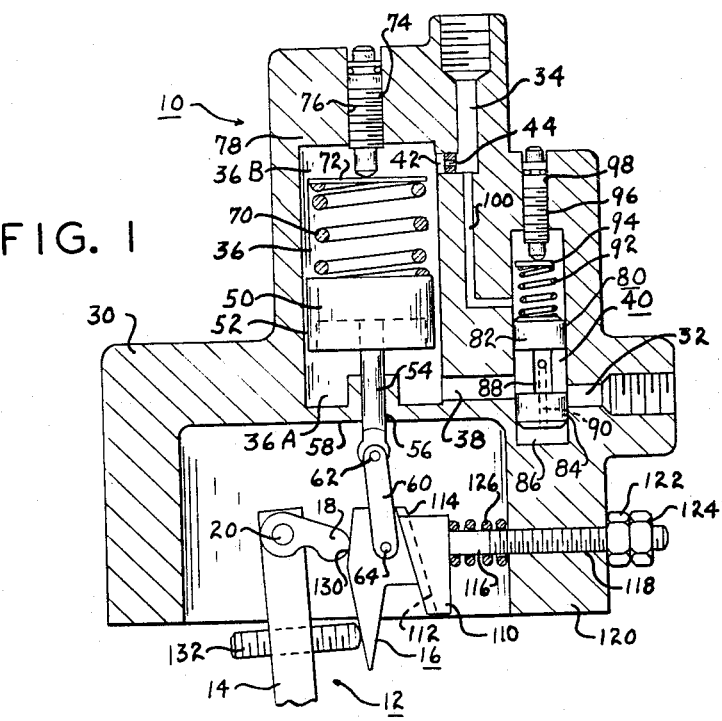

The density and viscosity of fuels used in the operation of internal combustion engines vary over a relatively wide range from one fuel to another, and with some fuels the density and viscosity vary appreciably with variations in temperature. Optimum performance of the engine cannot be maintained from one fuel to another having a different density and viscosity and under various temperature conditions, without adjusting the fuel flow in the metering device to compensate for the differences in density and viscosity. In the past, units have been incorporated in engine fuel systems for varying the stroke or limiting the delivery of fuel metering pumps, but these prior units have generally been unsatisfactory in that they were difficult to adjust to obtain the required compensation from one fuel to another, and would not maintain their setting or were otherwise unreliable. Further, the prior units have been complicated and/or difficult to manufacture, often involving close tolerances and expensive machining operations, and have been difficult to service and maintain in proper operating condition. Since the density and viscosity properties of the fuels vary with temperature variations, and these properties have a definite relationship to the heat value of each specific fuel, a control mechanism which senses density and viscosity can be used satisfactorily to provide the proper amount of each specific fuel over a wide range of fuels and over a wide temperature range, provided the mechanism can be properly adjusted with sufficient ease and can be made to maintain the required settings in the field for extended periods of time. It is therefore one of the principal objects of the present invention to provide a device for sensing the density and viscosity of different fuels under varying temperature conditions, which is relatively simple in construction and operation and which will respond readily to changes in the fuel density and viscosity from one fuel to another and over a wide range of temperatures.

Another object of the invention is to provide a fuel density and viscosity compensator in a fuel metering system for an engine, which can be easily and precisely calibrated and controlled to obtain the correct fuel delivery to the engine notwithstanding changes in the viscosity of a particular fuel or differences in density and viscosity from one fuel to another, and which will maintain the calibration and give optimum performance for long periods of time without further adjustment or attention.

A further object of the invention is to provide a density and viscosity fuel compensator having a relatively simple but an accurately formed flow passage capable of producing different control pressures for various fuels having different density and/or viscosity, and including a means for sensing the control pressure and responding to the pressure to regulate a fuel metering system in accordance with, in effect, the heat value per unit volume of each respective fuel.

Still another object of the invention is to provide a fuel density compensator device which can easily be fabricated with little difficulty in maintaining the required tolerances and which can be incorporated into a number of different types of standard engine fuel systems without any substantial changes being required in the system or in the device to adapt it to each particular fuel system.

Figure 2:
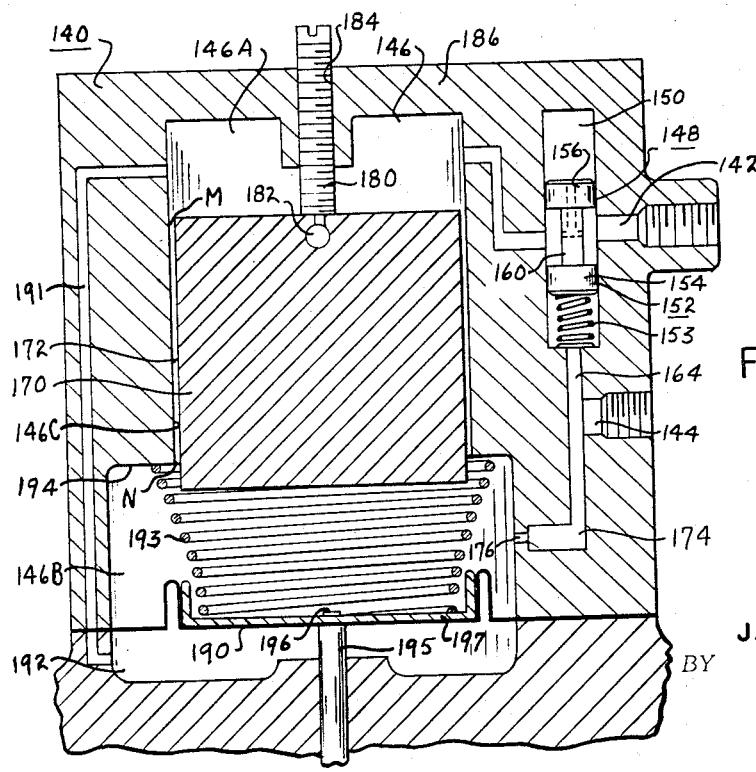
Figure 3:
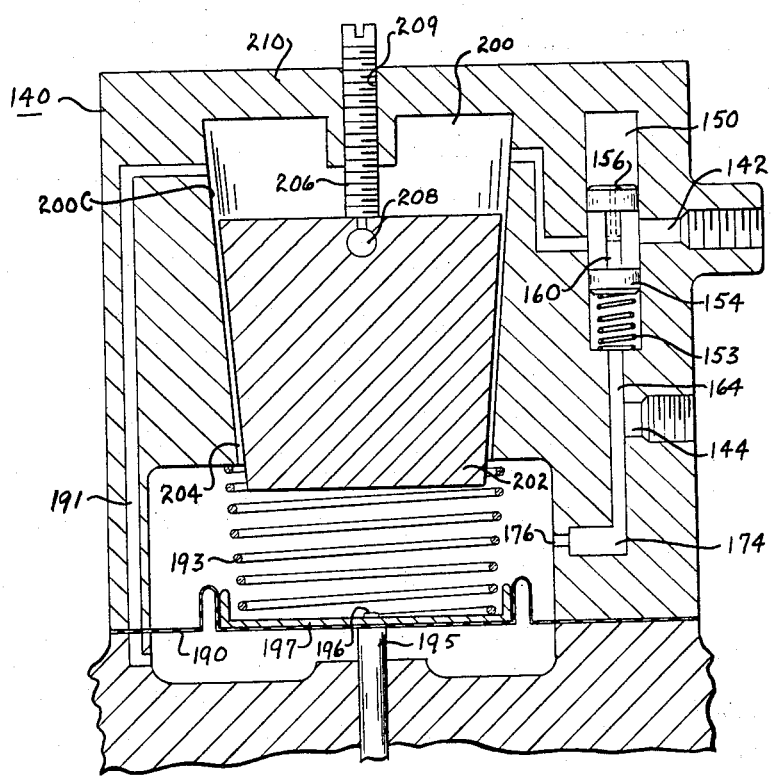

Additional objects and advantages of the invention will become apparent from the following description and accompanying drawings, wherein:

FIGURE 1 is a cross-sectional view of a fuel density compensating device embodying one form of the present invention, with the parts thereof being rearranged to show the operating relationship between the parts;

FIGURE 2 is a cross-sectional view of a fuel density compensating device illustrating a modified form of the invention, the parts thereof being rearranged to illustrate more effectively the operation of the device; and FIGURE 3 is a cross-sectional view of a fuel density compensating device illustrating a further modified form of the invention, the parts thereof being rearranged to illustrate more effectively the operation of the device.

Referring more specifically to the drawings, and to FIGURE 1 in particular, the present fuel density compensating device is designated by the numeral 10 and is shown connected to a linkage 12 of a fuel metering pump (not shown), the linkage of the pump being connected by a lever 14 to a speed sensitive control system. Lever 14 is connected to a control element or stop plate 16 by a cam 18 on lever 14 pivotally mounted thereon by a pin 20 at the upper end of lever 14. Plate 16 functions as a stop to limit the maximum output of the fuel pump, the type of pump used in the system being of well known construction in which the fuel is metered in a plurality of cylinders by reciprocating pistons and is delivered to the engine cylinders under high pressure and discharged directly into the combustion chamber of the engine. Since the construction and operation of this type of fuel metering pump are well known and the details thereof are not important for a full understanding of the present invention, the metering pump will not be described herein.

The embodiment of the fuel density compensating device illustrated in FIGURE 1 consists of a housing 30 having a fuel inlet passage 32 connected to a source of fuel, and a fuel outlet passage 34 connected to a drain line from the fuel metering pump, and having a cylindrical chamber 36 therein connected to inlet passage 32 by a passage 38 and a pressure regulator 40, and to outlet passage 34 by a passage 42. An orifice 44 which functions as a fixed turbulent flow restriction is disposed in the outlet passage adjacent chamber 36. A piston 50 slightly smaller in diameter than the chamber 36 forms, in conjunction with the side walls of the chamber, an annular laminar flow restriction 52 and reciprocates in the chamber in response to variations in the differential in pressures in sections 36A and 36B of the chamber below and above the piston, as viewed in FIGURE 1. Piston 50 controls the position of stop plate 16 and thereby controls the fuel metering pump, the piston being connected to plate 16 by piston rod 54 extending through opening 56 in end wall 58 of the chamber, and a link 60 pivotally attached to the lower end of the rod by a pin 62 and to element 16 by a pin 64. A coil spring 70 is mounted in section 36B of the chamber and reacts between the upper end of piston 50 and an adjustment means consisting of a washer 72 positioned on the upper end of the spring and a screw 74 threadedly received in a bore 76 in the upper end wall 78 of the chamber, the compression on spring 70 being adjusted by adjusting screw 74 inwardly or outwardly in threaded bore 76.

The differential in fuel pressures between the fuel inlet and the outlet passages is controlled by regulator 40 consisting of a valve element 80 with two cylindrical portions 82 and 84 disposed in bore 86 and connected by a stem 88. The lower end of bore 86 is connected to the fuel in inlet passage 32 by a passage 90 extending from the center of the stem through portion 84; thus, the inlet pressure is applied to the inner faces of portions 82 and 84 and to the outer face of portion 84, the inlet pressure thus sensed by the valve element urging the valve element upwardly, as viewed in FIGURE 1, toward closed position. The closing effect of fuel inlet pressure on the valve element is opposed by coil spring 92 mounted in the upper end of bore 86 and adjusted by a spring adjustment means consisting of a washer 94 on the end of the spring and a screw 96 threadedly received in a bore 98 in the housing wall. The valve element is also subjected to a reference pressure in the system by a passage 100 connecting bore 86 above the valve element with the outlet passage 34 posterior to turbulent flow restriction 44. It is thus seen that the pressure regulator determines the pressure in section 36A of chamber 36 in response to variations in the outlet passage 34 and the compression of spring 92 as determined by the adjustment screw 96.

The stop plate 16 is adjusted to select a predetermined output of the metering pump by a member 110 having a cam surface 112 for engaging cam surface 114 of plate 16, member 110 being adjustable forward and away from the plate by a shaft 116 extending through threaded bore 118 in housing section 120. Two nuts 122 and 124 are threaded onto the outer end of the shaft and a spring 126 reacting between the internal wall of housing section 120 and one side of member 110 urges shaft 116 and member 110 to the left as viewed in FIGURE 1 and, together with the two nuts, holds member 110 in its adjusted position. The stop plate surface controls cam nose 130 or pin 132 and through lever 14 regulates the operation of the fuel metering pump.

In the operation of the embodiment of the invention illustrated in FIGURE 1, the fuel on entering the device through inlet passage 32 is controlled by regulator 40 to maintain a constant differential between the pressure of the fuel in inlet passage 38 and the outlet passage 34. The drop in pressure from chamber section 36A to 36B across laminar flow restriction 52 is determined primarily by the viscosity of the fluid flowing through the laminar restriction and, since the drop in pressure is sensed by piston 50, the piston assumes a position in chamber 36 representative of the fuel viscosity and shifts stop plate 16 to the position required to meet engine fuel requirements. For example, if the viscosity of the fuel passing through device 10 increases, the drop in pressure from chamber section 36A to 36B increases, thereby causing the piston to move upwardly, as viewed in FIGURE 1, and repositioning stop plate 16 to compensate for the increased viscosity. Any variation in the fuel pressure in outlet passage 34 is transmitted through passage 100 to bore 86 above valve element 80, thereby adjusting the valve element to correct for the variation in pressure occurring in the outlet passage and thereby maintaining a substantially constant differential in pressure from the inlet to the outlet of the device without disturbing the differential between chamber sections 36A and 36B across laminar flow restriction 52 or between chamber section 36B and the outlet passage across turbulent flow restriction 44.

In view of the difficulty in maintaining the tolerances required to obtain optimum performance of devices of this type, two principal adjustment means are provided. First, the compression on spring 70 is adjusted by screw 74 to shift piston 50 and stop plate 16 upwardly or downwardly to correct inaccuracies in fabrication and to obtain the precise setting required. Second, the adjustment mechanism consisting of spring 92 and screw 96 is provided for varying the position of the regulator valve element to increase or decrease the pressure in chamber section 36A and thereby vary the differential between chamber section 36A and outlet passage 34. This results in a change in the pressure differential between chamber sections 36A and 36B, which shifts piston 50 and hence stop plate 16 slightly upwardly or downwardly as the compression on spring 92 is increased or decreased by screw 96. Since these two adjustments can be readily and precisely made, the system can be regulated to obtain optimum performance and to maintain this performance over extended periods of time.

Referring to the embodiment of the invention illustrated in FIGURE 2, numeral 140 designates a housing having an inlet passage 142 and an outlet passage 144 connected to the housing by a chamber 146. Regulator 148 disposed in the inlet passage is essentially the same as the regulator described in connection with the previous embodiment, consisting of a bore 150, a valve element 152 in the bore, and a spring 153 urging the valve toward open position. The valve element has two cylindrical portions 154 and 156 connected by a stem 160 and is subjected on the lower side to the reference pressure in outlet passage 144 through a passage 164. The regulator maintains a substantially constant differential between the pressures in inlet passage 142 and outlet passage 144.

A cylinder 170 is disposed in chamber 146 and is only slightly smaller in diameter than cylindrical chamber 146 to provide a laminar flow restriction 172 between the periphery thereof and the side walls of the chamber. The cylinder divides chamber 146 into inlet or upper section 146A and an outlet or lower section 146B, the outlet section being connected to outlet 144 by a passage 174 having a turbulent flow restriction 176 at the entrance thereof. In order to adjust the effective flow through laminar restriction 172 to correct for inaccuracies in machining and to obtain optimum performance, an adjustment means is provided consisting of threaded shaft 180 rotatably connected to the cylinder 170 by a ball and socket construction 182 in the upper end of the cylinder. The screw is disposed in a threaded bore 184 in end wall 186 of housing 140 and turns independently of the cylinder. Rotation of shaft 180 moves cylinder 170 either upwardly or downwardly, thereby decreasing or increasing the length of laminar flow restriction 172, restriction entrance M, and exit N, by extending the cylinder from the smaller diameter portion 146C of the chamber or withdrawing the cylinder into portion 146C, thus increasing or decreasing the effective flow through restriction 170. The pressure differential across laminar flow restriction 172, i.e. between chamber sections 146A and 146B, is sensed by a diaphragm 190 which forms an end wall for chamber 146, and which is subjected to the inlet pressure in chamber section A by channel 191 and chamber 192 on the lower side of the diaphragm. A spring 193 of preselected calibration reacting between the diaphragm and shoulder 194 urges downwardly as viewed in the drawing, and prebiases the diaphragm. The diaphragm is connected to a stop plate similar to stop plate 16 by a shaft 195 secured to the diaphragm by a riveted end 196 and stiffening plate 197. The peripheral edges of the diaphragm 190 are secured in place in sealed relationship between two sections of housing 140, thus forming a closure for the lower end of the chamber.

In the operation of the embodiment of the invention illustrated in FIGURE 2, fuel is supplied through inlet passage 142 and maintained by regulator 148 at a substantially constant value with reference to the pressure in outlet passage 144. If the viscosity of the fuel flowing through the device increases, the pressure in section 146B of chamber 146 decreases, causing diaphragm 190 to move upwardly or inwardly into chamber 146, thereby moving rod 195 upwardly, which in turn shifts a stop plate similar to stop plate 16 to the position required to compensate for the change in fuel viscosity. In order to adjust the pressure in section 146B to that required to control the stop plate properly and to correct for inaccuracies in fabrication, the shaft 180 is rotated in the direction to either increase or decrease the length of the laminar flow restriction 172 between points M and N and thereby decrease or increase the pressure in section 146B for a fuel with a known viscosity.

The embodiment of the invention illustrated in FIGURE 3 is similar in most respects to the embodiment illustrated in FIGURE 2 and hence like numerals will be used to identify like parts. In the embodiment of FIGURE 3, a chamber 200 having a frustoconically shaped portion 200C contains a frustoconically shaped member 202 which has the same taper as the walls of portion 200C and is spaced a small distance from the walls of the chamber portion. The space between the external surface of member 202 and the walls of chamber portion 200C provide a laminar flow restriction 204. In order to adjust the effective size of the laminar flow restriction 204, the frustoconically shaped cylinder 202 is adjusted longitudinally, i.e. upwardly or downwardly, in chamber 200 by an adjustment means consisting of a rotatable threaded shaft 206 connected to the upper end of member 202 by a ball and socket 208, the shaft being received in a threaded hole 209 in upper wall 210 of the housing. Rotation of threaded shaft 206 raises or lowers cylinder 202, thereby varying the space between the external wall of the cylinder and the wall of chamber 200. The operation of the embodiment of the invention illustrated in FIGURE 3 is the same as that of the embodiment illustrated in FIGURE 2, with the exception of the manner in which the laminar flow restriction 204 is adjusted. The adjustment may be made readily while the device is in operation by merely rotating shaft 206, and when the device has been calibrated, it will retain the adjustment for extended periods of time.

While three embodiments of the present invention have been described in detail herein, various changes and modifications may be made to adapt the device to various fuel systems without departing from the scope of the invention.

I claim:

1. A regulating device for a fuel system, comprising a housing having a chamber, a fuel inlet passage connected to one end of said chamber and a fuel outlet passage connected to the other end of said chamber, a member in said chamber forming, in conjunction with the side walls of said chamber, an annular laminar flow restriction, an orifice forming a turbulent flow restriction, said annular laminar flow restriction and said orifice being connected in series between said inlet passage and said outlet passage, means forming a movable wall responsive to the fuel pressure between said member and said orifice, means connecting said movable wall to a fuel control element for varying the flow of fuel in the fuel system in response to variations in viscosity of the fuel therein, means for adjusting said member axially in said chamber to vary the effective operation of said movable wall on said element, and a regulator for controlling the pressure differential across said laminar and turbulent flow restrictions.

2. A regulating device as defined in claim 1 in which said regulator for controlling the pressure differential across said laminar and turbulent flow restrictions is responsive to the fuel pressures in both the inlet and outlet passages, and is operable to vary the flow of fuel through the inlet passage.

3. A regulating device as defined in claim 2 in which said regulator for controlling the pressure differential across said laminar and turbulent flow restrictions includes an adjustment means for varying the pressure differential maintained by said regulator.

4. A regulating device as defined in claim 1 in which said chamber and said member in said chamber are cylindrical in shape, and in which said member in said chamber includes a means forming a movable wall responsive to the fuel pressure between said member and said orifice.

5. A regulating device as defined in claim 4 in which a spring means is disposed in said chamber and in which the means for adjusting said member axially in said chamber includes a screw for varying the effective force of said spring means.

6. A regulating device as defined in claim 2 in which said chamber and said member in said chamber are cylindrical in shape, and in which said member in said chamber includes a means forming a movable wall responsive to the fuel pressure between said member and said orifice.

7. A regulating device as defined in claim 3 in which a compression spring is disposed in said chamber, and in which the means for adusting said member axially in said chamber includes a screw for varying the compression on said spring.

8. A regulating device as defined in claim 1 in which the wall of said chamber is of two different diameter portions with the smaller diameter having an open end, and in which said member forms the laminar flow restriction with the smaller diameter portion and extends beyond the open end thereof.

9. A regulating device as defined in claim 8 in which the effective length of said annular laminar flow restriction is varied by moving said member axially in said smaller diameter portion of said chamber.

10. A regulating device as defined in claim 2 in which the wall of said chamber is of two different diameter portions forming an annular shoulder therebetween, and said member forms the laminar flow restriction with the smaller diameter portion.

11. A regulating device as defined in claim 10 in which the effective length of said annular laminar flow restriction is varied by moving said member in said smaller diameter portion of said chamber axially across said shoulder.

12. A regulating device as defined in claim 1 in which the walls of said chamber and said member are frustoconical in shape and parallel with one another.

13. A fuel regulating device as defined in claim 12 in which a means is provided for moving said member axially with respect to said chamber wall and thereby varying the effective size of the laminar flow restriction.

14. A regulating device as defined in claim 2 in which the walls of said chamber and said member are frustoconical in shape.

15. A fuel regulating device as defined in claim 14 in which a means is provided for moving said member axially with respect to said chamber wall.

References Cited

UNITED STATES PATENTS

| | | | |
|---|---|---|---|
| 3,170,503 | 2/1965 | Isley et al. | 91—52 |
| 3,215,185 | 11/1965 | Black | 91—52 X |
| 3,293,991 | 12/1966 | Isley et al. | 91—52 |

FREDERICK G. MATTESON, JR., *Primary Examiner.*

E. G. FAVORS, *Assistant Examiner.*